Dec. 26, 1967  J. D. TUTHILL  3,360,414
MANUFACTURE OF HARD-SURFACED COVERINGS AND
DECORATIVE CLIPS THEREFOR
Filed Feb. 7, 1964  3 Sheets-Sheet 1

INVENTOR.
JAY D. TUTHILL
BY Richard Whiting
ATTORNEY.

INVENTOR
JAY D. TUTHILL
BY Richard Whiting
ATTORNEY.

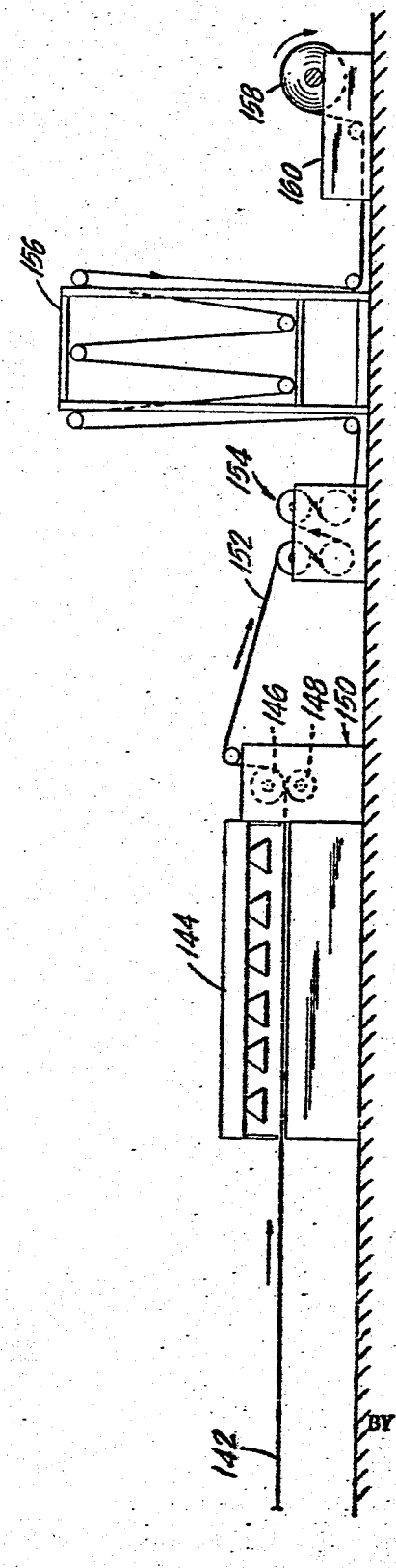

3,360,414
MANUFACTURE OF HARD-SURFACED
COVERINGS AND DECORATIVE CLIPS
THEREFOR
Jay D. Tuthill, Salem, N.J., assignor to Mannington Mills, Incorporated, Salem, N.J., a corporation of New Jersey
Filed Feb. 7, 1964, Ser. No. 343,418
9 Claims. (Cl. 156—264)

ABSTRACT OF THE DISCLOSURE

A novel method making decorative hard-surfaced floor and wall coverings, counter tops and the like, as well as decorative chips therefor, is disclosed. A liquid composition is applied to a fibrous backing. The material with which the backing is coated and the material from which the chips are made both comprise compositions consisting of plastisols of resins of desired characteristics dispersed in suitable plasticizers. The composition is a dispersion in one or more plasticizers of one or more vinyl resins, specifically polyvinyl chloride, preferably of varied particle sizes, which dispersion, with or without added filler, provides a composition which is of a readily coatable viscosity at ambient temperature, and which, upon heating to a state of partial gelation, undergoes a desired controlled increase in viscosity or firmness. This change in physical properties of the composition is utilized when the composition is employed to make chips as well as when it is used to make the wear layer proper. For chip manufacture, the composition, applied as a liquid to release paper and then partially gelated by heat, is thereafter stripped from the paper, cut into chip sizes and conveyed to and deposited on the surface of the wear layer coat, which is still in the low viscosity liquid stage in which it was applied to the backing. Heat is then applied, still further gelating the chips and firming the wear layer coat so that it may be subjected to the pressure of rolls on its surface for chip embedment. Upon further heating, gelation of the composition as surface coat with embedded chips is completed to final fusion, so that upon cooling, the wear layer of desired characteristics is set up.

The resulting decorative products are smooth and free of smears or other evidence of deleterious chip deformation.

---

This invention relates to the manufacture of hard-surface floor and wall coverings, counter tops and the like, comprising a flexible plastic sheet applied as a liquid and thereafter hardened and bonded to fibrous backing material and having flexible decorative plastic chips embedded therein.

My invention includes a composition whose components are effective to produce desired properties at each of several stages of forming the product. I have provided, for application to the fibrous backing, a composition comprising a liquid of low but controlled viscosity permitting its application as a continuous sheet by conventional liquid applicators, the sheet being firm enough at ambient temperature to retain its applied thickness and to support on its surface decorative preformed plastic chips which are deposited thereon. The composition, after fluid application and chip deposit, undergoes a controlled increase in viscosity which permits the application of roll pressure to the surface on which the chips are deposited without undue distortion or undulation of the surface, so that the chips are embedded below the surface of the sheet without smearing them or detracting from their integrity as clearly defined chips. Finally, the composition, with embedded chips, is hardened to provide the finished flexible but serviceable wear layer.

In accordance with my preferred practice, the material with which the backing is coated and the material from which the chips are made both comprise compositions consisting of plastisols of resins of desired characteristics dispersed in suitable plasticizers. The composition is a dispersion in one or more plasticizers of one or more vinyl resins, specifically polyvinyl chloride, preferably of varied particle sizes, which dispersions, with or without added filler, provides a composition which is of a readily coatable viscosity at ambient temperature, and which, upon heating to a state of partial gelation, undergoes a desired controlled increase in viscosity or firmness. This change in physical properties of the composition is utilized when the composition is employed to make chips as well as when it is used to make the wear layer proper. For chip manufacture, the composition, applied as a liquid to release paper and then partially gelated by heat, is thereafter stripped from the paper, cut into chip sizes and conveyed to and deposited on the surface of the wear layer coat, which is still in the low viscosity liquid stage in which it was applied to the backing. Heat is then applied, still further gelating the chips and partially gelating and firming the wear layer coat so that it may be subjected to the pressure of rolls on its surface for chip embedment. Upon further heating, gelation of the composition as surface coat with embedded chips is completed to final fusion, so that upon cooling, the wear layer of desired characteristics is set up.

The resin comprises an emulsion resin, which is a dry polyvinyl chloride of small particle size commonly used in liquid paste technology, preferably mixed with a blending resin, which is a larger particle size homopolymer of polyvinyl chloride, also available in dry form. The composition may contain as much as, but preferably, 45 parts of blending resin per hundred parts of emulsion resin.

Plasticizers supplied are in quantity adjusted to the final plasticizer requirements of the resinous binder to form an organosol thereof, gelatable at the proper high temperature gelation points. These various selected stages of gelation result from variations of the solubility of the resins in the plasticizer at different elevation temperatures. The plasticizer is employed in quantities ranging preferably from about 25 phr. (part per hundred parts total resin) to about 40 phr.

Further viscosity control may be afforded by the addition of a viscosity depressant; typically, polyethylene glycol-400 monolaurate and a diluent such as high boiling aromatic hydrocarbon.

As indicated, a critical control in the manufacture of my floor covering is in the adjustment of the initial viscosity of the coating composition preferably to have a Brookfield viscosity in the range of 5,000 to 20,000 cps. with possible limits between 1,000 and 40,000, measured with a number 4 spindle at 20 r.p.m. Again, in terms of Severs, a viscosity between 10,000 and 20,000 cps. at 100 p.s.i. with 0.1578 cm. orifice is preferred, with upper and lower limits of 5,000 to 40,000 cps. being possible, and viscosities usually being measured at ambient temperature of 75° F.

The fluid mix with the preselected rheological properties incorporated as described, according to the formulation below, is applied to a fibrous backing layer as a laminate in a coated thickness in the preferred range of 0.015 to 0.050 inch and a possible broader range of from 0.010 to 0.125 inch being permissible. Typical conventional fluid applicator equipment including reverse roll coating, doctor blade or rubber blanket coating elements are useful for this substantially cold application of a controlled viscosity liquid to a fibrous web backing.

The plastic chip to be embedded is usually obtained from a sheeted plastic preferably of the same composition, except for pigmentation or the lack of it or other decorative contrast with the coating composition, and cut in desired geometric forms or broken into irregular shaped chips. Thus, the decorative chips are within the thickness range preferably of from about .004 to .075 inch. These decorative chips may, of course, be used otherwise than for deposit on and embedment in a predeposited liquid wear layer coat, as will be understood in the industry, but when so used, as herein described, the chips should, of course, be thinner than the liquid layer in which they are embedded.

The emulsion resin is available commercially under different labels such as VR 50 of Naugatuck Chemical Company, PVC No. 7013 of the Diamond Alkali Company, or Goodrich No. 121. This resin can be a homopolymer of polyvinyl chloride, or I can use a copolymer of vinyl chloride and vinyl acetate such as Geon 135 made by B. F. Goodrich.

The blending resin, of larger particle size, may be a homopolymer of polyvinyl chloride available in dry form, as, for example, PVC 260 C manufactured by Borden Chemical Co. It enhances rheological properties by lowering viscosities without degrading the desired physical properties such as heat and light stability and clarity.

The known phthalate plasticizers such as butyl cyclohexyl phthalate, di iso decyl phthalate, di octyl phthalate and other plasticizers such as tricresyl phosphate may be used alone or in blends and may be mixed with other plasticizing compounds where effective to form the low viscosity plastisol gelatable under heat, as described.

Although my invention may be used with clear coat compounds, either the wear layer proper or the deposited chips and frequently both are opaque, in which event the composition is highly loaded, principally with filler. The material employed is preferably calcium carbonate with a low oil absorption value of about 4-6. This low value contributes to the provision of a paste of desired low viscosity with less plasticizer than would otherwise be required. My preferred filler is calcium carbonate in a range of from about 40 to 325 mesh. Other fillers that may be used include clay, mica, barytes, diatomaceous earth, etc. Pigment is also employed if an opaque coating is desired, and titanium dioxide is typical of pigments that may be used. Although my invention is useful with clear coat compositions for the wear layer, it is of significance that I have been able to apply coatings of compositions substantially loaded with fillers, as much as 60% by weight, using cold liquid application techniques by virtue of the rheological properties of my compositions. Excellent results are obtainable using as much as 125 parts filler and pigment to 100 parts total resin.

A stabilizer is used to give light and heat stability in order that the compound may be processed at high temperature without discoloration of the vinyl compounds. Barium zinc stabilizer may be used.

The following are typical compositions in parts by weight and viscosities obtained:

| Materials | 61% Binder | 55% Binder | 63% Binder |
|---|---|---|---|
| Emulsion resin | 250.0 | 250.0 | 250.0 |
| Blending resin | 150.0 | 150.0 | 150.0 |
| Plasticizer | 160.0 | 160.0 | 160.0 |
| Filler | 360.0 | 460.0 | 260.0 |
| Pigment | 12.5 | 12.5 | 12.5 |
| Viscosity depressant | 8.0 | 8.0 | 8.0 |
| Stabilizer | 15.0 | 15.0 | 15.0 |
| Diluent | | | |

| | Centipoises (Initial) | | |
|---|---|---|---|
| Brookfield Viscosity— | | | |
| At 20 r.p.m. | 6,250 | 11,000 | 5,250 |
| At 2 r.p.m. | 10,000 | 17,500 | 10,000 |

| | After 24 hrs. Aging | | |
|---|---|---|---|
| At 20 r.p.m. | 16,500 | 20,500 | 10,000 |
| At 2 r.p.m. | 25,000 | 37,500 | 22,500 |

| | Centipoises | | |
|---|---|---|---|
| Severs Viscosity (Pressure): | | | |
| 20 lbs | 10,900 | 12,600 | 8,010 |
| 60 lbs | 14,100 | 17,200 | 9,830 |
| 100 lbs | 16,200 | 18,900 | 10,300 |

Within the viscosity ranges specified, many compositions can be formulated, and as typifying compositions at opposite extremes with respect to filler-pigment content, the following are useful:

| Materials | Filler 0 phr. | Filler 125 phr. |
|---|---|---|
| Emulsion resin | 300 | 512 |
| Blending resin | 100 | 128 |
| Plasticizer | 128 | 205 |
| Filler | | 800 |
| Pigment | | 55 |
| Viscosity depressant | 8 | 13 |
| Stabilizer | 20 | 32 |
| Diluent | 5 | 50 |

The components of the composition may conveniently be batch mixed by first mixing the emulsion and blending resins, then adding the filler with thorough mixing; the plasticizer, stabilizer, and viscosity depressant are then added and thoroughly mixed, next, the titanium dioxide or other pigment is added an mixed and, finally the diluent, if any, is added and mixed. It is essential that a high energy input mixing device which does not develop significant heating during the mixing operation be employed, since any temperature above 100° F. is undesirable as resulting in a build-up in viscosity.

As above referred to, the wear layer preferably has chips embedded in it for decorative purposes. These chips may be of different selected colors. Apart from pigmentation, the composition from which the chips are formed may be and desirably is the same as the composition of the wear layer and accordingly may comprise any of the formulas above set forth, with suitable pigments added or substituted for the titanium dioxide. The composition is formed into a partially fused layer to provide a chip thickness ranging from .004 to .075 inch in a manner to be described.

In the manufacture of hard-surfaced floor covering in accordance with my invention, the backing on which the wear layer is to be deposited may be composed of any desirable high-grade material, preferably either a felt of fibers composed of a mixture of cotton rags and synthetics with a binder, or a web of asbestos fibers impregnated with synthetic rubber. The web may, however, be of woven fiberglass, matted fiberglass, or the like. It is possible to utilize a sheet vinyl web for the backing material. Prior to the application of the wear layer composition, the backing is given a bonding coat, which may be of an acrylic emulsion, compatible not only with the backing but with the vinyl coat.

In the drawings:

FIGS. 2a and 2b are diagrammatic views showing, in elevation, the steps in applying the wear layer composition to a backing material, FIG. 2b being a continuation of FIG. 2a.

Figure 1:
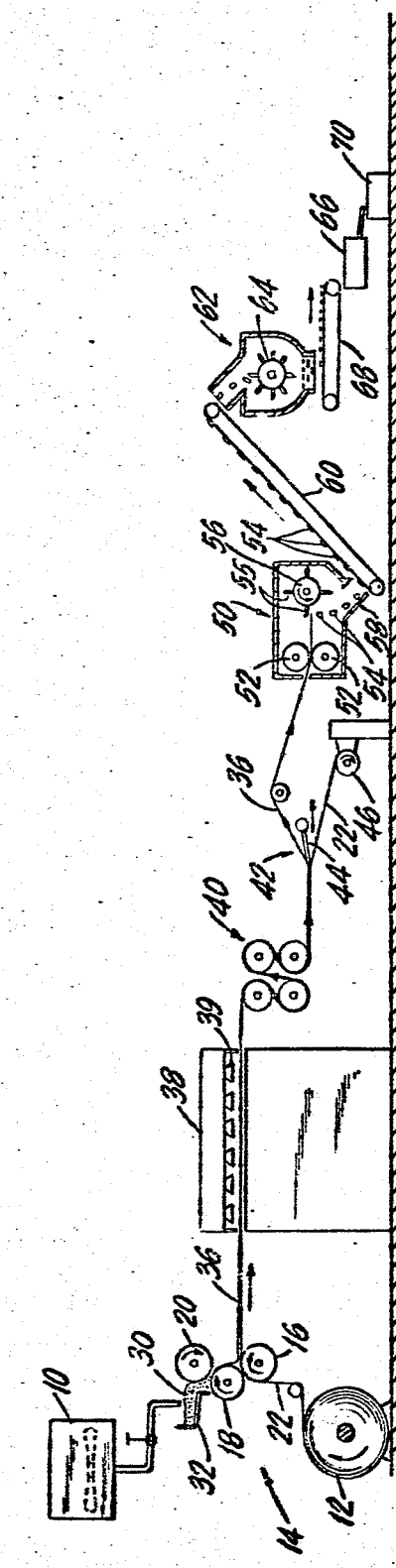
FIG. 1 is a diagrammatic view showing, in elevation, the steps in the production of ornamental chips.

Referring to FIG. 1, the numeral 10 indicates a source of vinyl composition used in making chips and 12 designates a supply of release paper of conventional sort having a glossy surface of low adhesion for ready separability from the vinyl layer with which it is to be coated. 14 indicates generally a reverse roll coater of conventional sort having three rolls 16, 18, and 20, all of which rotate clockwise. Release paper 22 from supply 12 is fed with its glossy surface uppermost over roll 16. Roll 16 is driven from a source of power, not shown, at a peripheral speed which conforms to a desired line speed of the paper 22 being coated; roll 18 rotates at a faster speed; roll 20 at a slower speed as is conventional in such reverse roll coaters. Chip-forming composition 30 is delivered from source 10 to the reverse coater supply trough 32. The space separating rolls 18 and 20 is adjustable to vary the rate of delivery of composition 30, which is wiped onto the surface of release paper 22 at a speed affected by the rate of travel of the release paper. The coating is designated 36.

The coated paper passes immediately into an oven 38 containing an overhead radiant heater 39. The magnitude of the heat source, its proximity to the uppermost coated surface of the paper, and the rate of speed of the coated paper through the oven are so related that partial fusion or gelation of the coating takes place in the heater. The partial fusion enables the composition to be handled during the subsequent steps in chip manufacture while assuring optimum bonding of the chips with the wear layer with which they are later consolidated. Such partial fusion can be tested by tensile test, and for compositions of the constituents above described, I have found that a composition temperature of from 250° to 300° F. upon emergence from the oven will assure the desired partial fusion.

After leaving the oven, the coated paper passes, as indicated, through a bank of cooling rolls 40 to lower the temperature of the composition and thereby enable it to be handled without damage in subsequent operation.

The coated paper then passes to stripper 42 consisting of suitable means such as a stationary, or preferably oscillating, blade 44 effective to strip the coating 36 from the release paper 22, as the coated paper advances against the blade. The paper is then wound at 46 and may be reused. The partially fused strip 36, which now is self-sustaining in tensile strength, is next cut to desired chip size, for which purpose it is introduced to dicer 50, where the web is first slit lengthwise into strips through the slitter rolls 52 and then cut transversely into squares 54 by knives 55 on roll 56, which delivers the diced squares 54 to chute 58 and thence to conveyor belt 60. The squares are delivered by the belt to the comminuter 62 having a bladed rotor 64 into the housing of which the diced squares 54 are fed and where they meet a counter-flow of liquid carbon dioxide which freezes the particles so that they can be cut more easily. The comminuter is effective to sever the diced squares into the smaller sizes desired, and the product of the comminuter may then be assorted as to size by suitable screening mechanism 66 to which the comminuted material is delivered by conveyor 68. The assorted sizes are delivered to individual containers 70. Chips so formed are delivered to the main production line for incorporation as decoration into the wear layer.

Figure 2A:
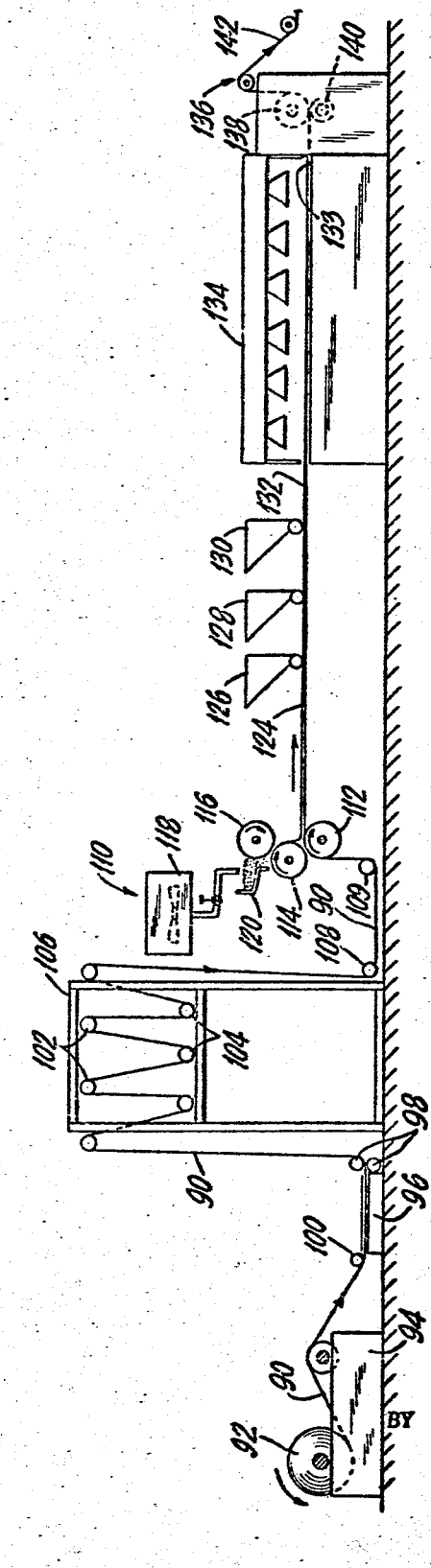

As shown in FIG. 2a, the web 90 of fibrous backing is fed from a supply 92 on a roll-off stand 94 to splice table 96 over which it is drawn by pull rolls 98 and suitably guided by roll 100. Thence the web travels over the upper and lower rolls 102 and 104 of an accumulator 106 and from there around guide rolls 108 and 109 to reverse roll coater 110. The accumulator 106 functions in conventional fashion to accumulate the web from splice table 96 at one linear speed and deliver it to reverse roll coater 110 at a different speed so that the web traveling through and beyond the reverse roll coater 110 may be processed at any desired rate of linear speed while the web is stopped at the splice table for replenishment of an exhausted supply roll 92.

Reverse roll coater 110 may be identical in its principle of construction and operation to the coater 15 (FIG. 1) having three rolls 112, 114, and 116, all of which rotate clockwise. Roll 112 is driven at the desired line speed. The coating composition delivered from source 118 to the supply trough 120 is admitted between rolls 114 and 116 at a feed rate dependent upon the spacing between these rolls, which is adjustable, and the relative roll speeds. Roll 114 wipes the composition on the upper surface of the web, where it is deposited as a coating. The thickness of the coating in accordance with my invention varies between about .015 inch and .050 inch, as a preferred range.

The web portion 124 with coating still a liquid of the viscosity at which it was applied, passes under the chip distribution system which, in the embodiment shown, consists of three distributors 126, 128, and 130, each for a different size chip. The chip depositor may be of conventional sort, power operated to deposit chips at a predetermined rate of speed relative to that of the web. The rate of deposit may vary relatively from one depositor to another dependent upon relative quantities desired of the chips of selected size or color. The plastisol coating composition being still liquid readily receives the decorative chips which, however, fall randomly, so that some of the chips may curl, some be disposed at an inclination to the axis of the web; others may be oppositely inclined, and still others may lie in a plane parallel to the plane of the web. Generally, they are not submerged in the coating but remain on the surface. The web on which chips have so been deposited is designated 132.

The web 132 passes through the heating oven 134, which heats the liquid plastisol to the point of partial gelation. By partial gelation, I mean that the coating has become semi-solid but still is soft enough to be indented under moderate pressure with the thumbnail or picked apart as a crude test. This condition may be referred to as the state of "incipient fushion." The web is heated to a sufficient temperature and for an adequate length of time to accomplish that degree of fushion and the criterion by which adequate heating may be measured is the temperature of the coated surface at emergence from the oven. For the plastisol compositions of the kinds above described, an emergent temperature of from about 180° F. to 220° F. will usually serve, for which purpose I employ adequate radiant heating units. The wear layer of the web, now designated 133, is somewhat rough in texture due to the random orientation of the deposited chips.

The web 133 is then passed through a consolidating unit 136 composed of a metal top roll 138 heated to a temperature of from 2500 F. to 2900° F. against which the hot coated surface of the sheet is pressed by rubber lower roll 140. The pressure of the lower roll is adjustable and is so controlled as to assure against distortion of the decorative chip particles. The web 142 emerging from the consolidating unit 136 will be noticeably smoother than at 133 and will have few surface imperfections as indicated from inspection as it travels to the second oven 144. Here the sheet is heated to a sufficient temperature for a sufficient length of time to complete the fusion between the resin and the plasticizer of the plastisol so that there are now no longer any discrete particles of either resin or plasticizer, but a complete solvation of the resin by the plasticizer is effected. Again, the temperature of the upper surface of the emerging web may be taken as the criterion of adequate heating at this stage and that temperature should be in the range of 300° F. to 400° F. for the compositions above referred to.

From the oven 144 the sheet then passes between upper and lower pressure rolls 146 and 148 of a unit 150. The upper roll may be heated to a mildly elevated temperature as from 70° F. to 160° F.; it may be chromium plated for a smooth surface and the web is pressed against it by lower roll 148, which is of rubber and is mounted for adjustable pressure.

From the unit 150 and the web 152 passes to a cooling unit 154, where the web passes around a series of drums which are cooled to drop the temperature of the web to the range of 80° F. to 90° F. From the cooling unit the web passes through an accumulator 156, which may in all respects be identical to the accumulator 106 described above, and the finished product is wound up at 158 on a suitable roll mounted on a wind-up stand 160.

I claim:

1. In the manufacture of decorative chips suitable for use in hard-surfaced cover material for floors, walls and the like, the steps comprising spreading on a web at ambient temperature a layer of a liquid composition having a Brookfield viscosity within the range from about 1,000 to about 40,000 cps., as measured with a number 4 spindle at 20 r.p.m. at a temperature of 75° F. and comprising solids, including a vinyl resin, suspended in a liquid including a plasticizer with which the solids gelate and fuse to an increasing extent with increase in temperature from a partial gelation at a predetermined elevated temperature within the range from about 250° F. to about 300° F. to a more complete final fusion at a higher temperature within the range from about 300° F. to about 400° F., heating the layer to said predetermined elevated temperature to effect said partial gelation and working the partially gelated material into desired form, said working including stripping the layer from the web and cutting the stripped layer into sheets.

2. In the manufacture of decorative hard-surfaced cover material for floors, walls and the like, the steps comprising spreading on a backing at ambient temperature a layer of a liquid composition having a Brookfield viscosity within the range from about 1,000 to about 40,000 cps., as measured with a number 4 spindle at 20 r.p.m. at a temperature of 75° F. and comprising solids, including a vinyl resin suspended in a liquid, including, in major proportion, a plasticizer with which the solids gelate and fuse to an increasing extent with increase in temperature from a partial gelation at a predetermined elevated temperature to a more complete final fusion at a higher temperature, depositing decorative chips on the surface of said liquid layer, heating the layer to said predetermined elevated temperature to effect said partial gelation, rolling the said surface of the partially gelated layer at about the aforesaid predetermined elevated temperature to embed therein chips so deposited, and heating to the said higher temperature the layer with embedded chips to effect the said final fusion.

3. The method as defined in claim 2 wherein the composition is an organosol spread to a thickness on the backing of about 0.010 to 0.125 inch.

4. The method as defined in claim 2 in which the resin is a polyvinyl chloride emulsion resin admixed with a polyvinyl chloride blending resin in an amount not exceeding 45 parts per 100 parts emulsion resin.

5. The method as defined in claim 2 in which the plasticizer is present in quantities ranging from about 25 to 40 parts per hundred parts resin.

6. The method as defined in claim 2 in which the composition is an organosol including up to 60% of a filler composed of from about 40 to 325 mesh calcium carbonate having an oil absorption value of from about 4 to 6.

7. The method as defined in claim 2 in which the predetermined elevated temperature to which the layer is heated to effect partial gelation lies within the range of from about 180° F. to 220° F. and the said higher temperature to which the layer is heated to effect the said final fusion is within the range of from about 300° F. to about 400° F.

8. In the manufacture of decorative hard-surfaced cover material for floors, walls, and the like, the steps comprising spreading on a release paper at ambient temperature about .004 to .075 inch in thickness of a layer of a liquid organosol having a Brookfield viscosity within the range from about 1,000 to about 40,000 cps., as measured with a number 4 spindle at 20 r.p.m. at a temperature of 75° F. and comprising solids, including a polyvinyl chloride resin, suspended in a liquid including a plasticizer with which the solids gelate and fuse to an increasing extent with increase in temperature from a partial gelation at a predetermined elevated temperature within the range from about 250° F. to about 300° F. to a more complete final fusion at a higher temperature within the range from about 300° F. to about 400° F., heating the layer to said predetermined elevated temperature to effect said partial gelation, stripping the partially gelated layer from the release paper, cutting the stripped layer into chip sizes, forming the said chips into the surface of a wear layer and heating the resulting article to said final temperature to effect the said final fusion.

9. The process of claim 8, wherein the wear layer is prepared by spreading on a backing at ambient temperature a layer of a liquid composition having a Brookfield viscosity within the range from about 1,000 to about 40,000 cps., as measured with a number 4 spindle at 20 r.p.m. at a temperature of 75° F. and comprising solids, including a vinyl resin suspended in a liquid, including, in major proportion, a plasticizer with which the solids gelate and fuse to an increasing extent with increase in temperature from a partial gelation at a predetermined elevated temperature to a more complete final fusion at a higher temperature, depositing decorative chips on the surface of said liquid layer to said predetermined elevated temperature to effect said partial gelation, and rolling the said surface of the partially gelated layer at the aforesaid predetermined elevated temperature to embed therein chips so deposited.

References Cited

UNITED STATES PATENTS

| 2,987,104 | 6/1961 | Benedict | 156—298 X |
| 3,049,761 | 8/1962 | Yabukik | 264—73 |
| 3,194,856 | 7/1965 | Ralmer | 264—76 |
| 3,194,859 | 7/1965 | Wacker | 264—123 |
| 3,265,548 | 8/1966 | Harkins et al. | 156—298 X |

EARL M. BERGERT, *Primary Examiner.*

R. R. SAVOIE, *Assistant Examiner.*

UNITED STATES PATENT OFFICE

CERTIFICATE OF CORRECTION

Patent No. 3,360,414                           December 26, 1967

Jay D. Tuthill

It is certified that error appears in the above identified patent and that said Letters Patent are hereby corrected as shown below:

In the heading to the drawings, line 3, and in the heading to the printed specification, line 3, "CLIPS", each occurrence should read -- CHIPS --. Column 8, line 51, after "layer" insert -- , heating the layer --.

Signed and sealed this 16th day of September 1969.

(SEAL)
Attest:

Edward M. Fletcher, Jr.                       WILLIAM E. SCHUYLER, JR.
Attesting Officer                                    Commissioner of Patents